United States Patent
Noh et al.

(10) Patent No.: US 8,810,089 B2
(45) Date of Patent: Aug. 19, 2014

(54) HYDRODYNAMIC BEARING ASSEMBLY AND MOTOR INCLUDING THE SAME

(75) Inventors: Jee Ae Noh, Seoul (KR); Ta Kyoung Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 178 days.

(21) Appl. No.: 13/067,959

(22) Filed: Jul. 11, 2011

(65) Prior Publication Data

US 2012/0187789 A1    Jul. 26, 2012

(30) Foreign Application Priority Data

Jan. 25, 2011   (KR) .......................... 10-2011-0007273

(51) Int. Cl.
*H02K 7/08* (2006.01)

(52) U.S. Cl.
USPC .......................................... 310/67 R; 310/90

(58) Field of Classification Search
USPC .......... 310/90, 67 R; 384/105, 107, 108, 121, 384/124
See application file for complete search history.

(56) References Cited

U.S. PATENT DOCUMENTS

| 5,264,748 | A  | * | 11/1993 | Ootsuka et al. ................. 310/90 |
| 6,717,310 | B2 | * | 4/2004  | Yoshikawa et al. ............. 310/90 |
| 7,420,304 | B2 | * | 9/2008  | Sugiyama et al. .............. 310/90 |
| 2002/0185925 | A1 | * | 12/2002 | Yoshikawa et al. ......... 310/67 R |
| 2006/0152097 | A1 | * | 7/2006 | Obata et al. ..................... 310/90 |
| 2006/0202577 | A1 | * | 9/2006 | Maekawa et al. ............... 310/90 |
| 2008/0158729 | A1 | * | 7/2008 | Tamaoka ................... 360/99.08 |

FOREIGN PATENT DOCUMENTS

| JP | 2008-190660 | 8/2008 |
| KR | 10-0815516 | 3/2008 |

* cited by examiner

*Primary Examiner* — Quyen Leung
*Assistant Examiner* — Naishadh Desai

(57) ABSTRACT

There is provided a hydrodynamic bearing assembly including: a sleeve having a shaft inserted thereinto and supported thereby; a thrust plate coupled to one end of the shaft; an extension part formed at the thrust plate to be extended in an axial direction so as to be coupled to the shaft; and a coupling part formed at the shaft to contact an inner surface of the extension part so as to be coupled to the extension part.

2 Claims, 3 Drawing Sheets

HYDRODYNAMIC BEARING ASSEMBLY AND MOTOR INCLUDING THE SAME

CROSS-REFERENCE TO RELATED APPLICATIONS

This application claims the priority of Korean Patent Application No. 10-2011-0007273 filed on Jan. 25, 2011, in the Korean Intellectual Property Office, the disclosure of which is incorporated herein by reference.

BACKGROUND OF THE INVENTION

1. Field of the Invention

The present invention relates to a bearing assembly and a motor including the same, and more particularly, to a bearing assembly in which a structure and a shape of a shaft or a thrust plate are changed to improve coupling force and reduce assembly defects, and a motor including the same.

2. Description of the Related Art

A motor generating driving force has been mounted in a hard disk drive (HDD) or an optical disc drive (ODD), both of which being computer information storage devices.

The motor may provide a space, in which a shaft may rotates, by a bearing. As the bearing, a hydrodynamic bearing, or the like, may be used.

Meanwhile, in order to allow the shaft to rotate while being supported within the bearing by the hydrodynamic pressure of the bearing, the shaft is inserted into and supported by a sleeve of the bearing.

However, when the shaft is supported by the hydrodynamic pressure, the shaft has force applied thereto upwardly in an axis direction to thereby be deviated.

In addition, when the shaft does not rotate, it is in contact with a base cover coupled to a lower portion of the sleeve.

In order to solve these defects, a thrust plate generating thrust hydrodynamic pressure may be coupled to the shaft such that the shaft may be floated to a predetermined position.

However, when a bonding process is performed in order to couple the thrust plate to the shaft, a bonded contact area is limited, such that sufficient coupling force is not provided.

In addition, when the thrust plate is coupled to the shaft, the thrust plate and the shaft are not assembled in a direction intended during initial design. Therefore, research into reducing assembly defects while maintaining sufficient coupling force during the coupling of the thrust plate to the shaft has been required.

SUMMARY OF THE INVENTION

An aspect of the present invention provides a hydrodynamic bearing assembly in which coupling force between a thrust plate and a shaft configuring the hydrodynamic bearing assembly is improved and assembly defects are reduced, and a motor including the same.

According to an aspect of the present invention, there is provided a hydrodynamic bearing assembly including: a sleeve having a shaft inserted thereinto and supported thereby; a thrust plate coupled to one end of the shaft; an extension part formed at the thrust plate to be extended in an axial direction so as to be coupled to the shaft; and a coupling part formed at the shaft to contact an inner surface of the extension part so as to be coupled to the extension part.

The coupling part may contact the inner surface and an outer surface of the extension part.

The coupling part may include a first coupling part contacting the inner surface of the extension part and a second coupling part contacting an outer surface of the extension part, and the extension part may include a hollow formed in order to be coupled to the first coupling part.

The extension part may include a plurality of extension parts having different diameters.

A plurality of extension parts having different diameters may be formed.

The extension part may be formed horizontally with the axial direction or at least one of the inner surface and an outer surface of the extension part may be formed to be tapered.

The extension part may be formed in a continuous or interrupted manner in a circumferential direction.

The thrust plate may include a flat part formed to be extended from an end of the extension part in an outer diameter direction so as to support the extension part, and the flat part may have a disk shape or a doughnut shape.

The thrust plate may be a stopper contacting the sleeve to prevent excessive floating of the shaft.

At least one of upper or lower surfaces of the thrust plate may be provided with a thrust dynamic groove.

According to another aspect of the present invention, there is provided a motor including: the hydrodynamic bearing assembly of the present invention; a stator coupled to an outer circumferential surface of a sleeve and including a core having a coil for generating rotational driving force wound therearound; and a rotor having a magnet mounted on one surface thereof to be rotatable with respect to the stator, the magnet facing the coil.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
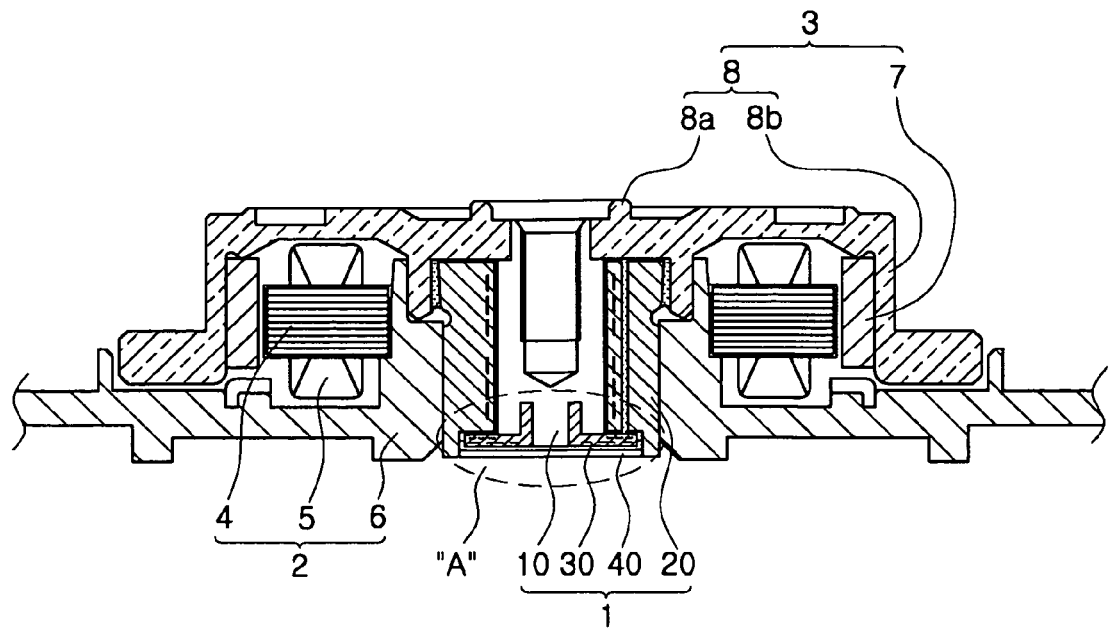
FIG. 1 is a cross-sectional view schematically showing a motor according to an exemplary embodiment of the present invention.

Exemplary embodiments of the present invention will now be described in detail with reference to the accompanying drawings.

However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

Figure 2:
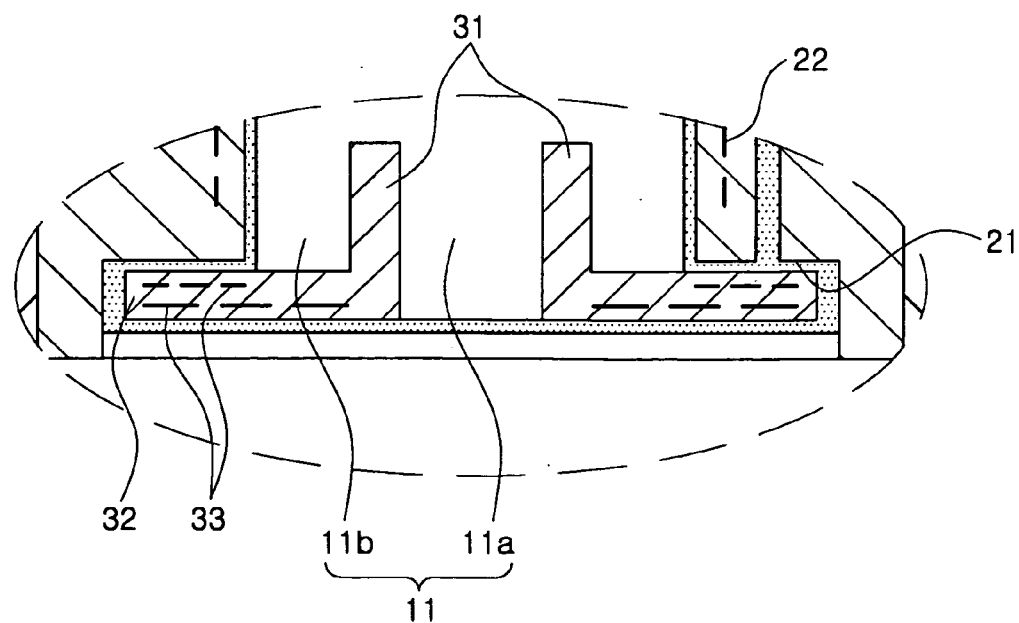
FIG. 2 is a partially enlarged cross-sectional view schematically showing part A of FIG. 1.

FIG. 1 is a cross-sectional view schematically showing a motor according to an exemplary embodiment of the present invention, and FIG. 2 is a partially enlarged cross-sectional view schematically showing part A of FIG. 1.

Referring to FIGS. 1 and 2, a motor according to an exemplary embodiment of the present invention may be configured to include a hydrodynamic bearing assembly 1, a stator 2, and a rotor 3.

The hydrodynamic bearing assembly 1 may include a shaft 10, a sleeve 20, a base cover 40, and a thrust plate 30. The detailed exemplary embodiments of the hydrodynamic bearing assembly 1 will be described below. The motor according to the present invention may have all of the specific characteristics of individual exemplary embodiments of the hydrodynamic bearing assembly 1.

First, defining terms for directions, an outer diameter direction means an outer edge direction of the rotor 3 based on the shaft 10, and an inner diameter direction means a center direction toward the shaft 10, based on the shaft 10. In addition, an axial direction means a vertical direction based on the shaft 10 in FIG. 1.

The shaft 10 may be inserted into the sleeve 20 in order to support the rotation of the rotor 3.

The shaft 10 may have the thrust plate 30 coupled to at least any one of an upper end and a lower end thereof. To this end, the shaft 10 may be provided with a coupling part 11 to contact an inner surface of an extension part 31 in order to be coupled to the extension part 31 of the thrust plate 30.

In addition, the coupling part 11 may also be formed to contact the inner surface and an outer surface of the extension part 31. That is, the coupling part 11 may include a first coupling part 11a contacting the inner surface of the extension part 31 and a second coupling part 11b contacting the outer surface of the extension part 31.

The sleeve 20 may support the shaft 10 such that the upper end of the shaft 10 protrudes upward in an axial direction.

In this configuration, the shaft 10 is inserted into a shaft hole of the sleeve 20 while having a micro clearance therewith, the micro clearance being filled with lubricant fluid.

The sleeve 20 may be provided with a bypass channel formed to communicate between upper and lower portions thereof to disperse the pressure of the lubricant fluid in an inner portion of the hydrodynamic bearing assembly 1, thereby maintaining balance in the pressure and moving air bubbles, or the like, existing in the inner portion of the hydrodynamic bearing assembly 1 so as to be discharged by circulation.

Meanwhile, an inner circumferential surface of the sleeve 20 may be provided with a radial dynamic groove 22 for generating dynamic pressure supporting the rotation of the shaft 10, and the radial dynamic groove 22 may have a spiral shape, a herringbone shape, or the like. The radial dynamic groove 22 may be formed in an outer circumferential surface of the shaft 10 as well as the sleeve 20. That is, the radial dynamic groove 22 may be formed in at least any one of the sleeve 20 and the shaft 10.

In addition, the radial dynamic groove 22 may be formed to have two sections in an upper portion and a lower portion of the sleeve 20 or the shaft 10 in the axial direction to generate balanced radial dynamic pressure, whereby the shaft 10 may be more stably supported.

Meanwhile, the lower surface of the sleeve 20 may be provided with an excessive floating prevention part 21 having an inner diameter relatively larger than that of the sleeve 20.

Therefore, when the shaft 10 is excessively floated due to rotation, the thrust plate 30 is stopped by the excessive floating prevention part 21, whereby the thrust plate 30 may serve as a stopper.

The base cover 40 may be coupled to a lower end of the sleeve 20 in order to prevent fluid used for generating the dynamic pressure from being leaked from the hydrodynamic bearing assembly 1.

A bonding method, a welding method, or the like, may be used in order to couple the base cover 40 to the sleeve 20.

During the coupling by the welding method, a spot welding method, or the like may be used, which may increase coupling force between the base cover 40 and the sleeve 20.

The bonding method having relatively small coupling force than that of the welding method may increase the coupling force between the base cover 40 and the sleeve 20 by using a structure and a coupling method capable of increasing a coupling area therebetween.

In addition, the base cover 40 may receive the lubricant fluid in a clearance between the base cover 40 and the sleeve 20 to serve as a bearing supporting a lower surface of the shaft 10.

The thrust plate 30 serves to prevent the shaft 10 from colliding with the base cover 40 by generating thrust dynamic pressure or serves to prevent excessive floating of the shaft 10 by generating thrust dynamic pressure in a direction opposite to the floating direction of the shaft 10 at the time of excessive floating of the shaft 10.

To this end, at least any one of an upper surface and a lower surface of the thrust plate 30 may be provided with a thrust dynamic groove 33.

That is, the thrust plate 30 may serve as a bearing supporting the lower surface of the shaft 10 by the thrust dynamic groove 33 formed in at least any one of the upper and lower surfaces of the thrust plate 30.

The thrust dynamic groove 33 may have a spiral shape, a herringbone shape, or the like, as in the case of the radial dynamic groove 22 described above.

The thrust plate 30 may include a flat part 32 extended from an end of the extension part 31 so as to support the extension part 31 and formed perpendicularly to the axial direction. The flat part 32 may have a disk shape or a doughnut shape. A detailed description thereof will be described below with reference to FIG. 6.

Meanwhile, when the shaft 10 is excessively floated due to the rotation, the thrust plate 30 is stopped by the excessive floating prevention part 21, whereby the thrust plate 30 may serve as the stopper. To this end, the thrust plate 30 may be formed to protrude in the outer diameter direction of the shaft 10. That is, the thrust plate 30 is formed to have an outer diameter larger than the inner diameter of the sleeve 20 with the exception of the excessive floating prevention part 21, whereby the thrust plate 30 may serve as the stopper.

In the case in which the thrust plate 30 is manufactured separately from the shaft 10 and is then coupled to the shaft 10, assembly defects, or the like, may be generated during assembling of the thrust plate 30 and the shaft 10. However, these defects may be solved by the coupling part 11 of the shaft 10 and the extension part 31 of the thrust plate 30.

That is, since an inner diameter of the extension part 31 may be formed to be smaller than an outer diameter of the upper portion of the shaft 10 with the exception of the coupling part 11, the upper portion of the shaft 10 having the diameter larger than the inner diameter of the extension part 31 may serve as a stopping part when the shaft 10 is coupled to the thrust plate 30.

Therefore, the stopping part serves as a reference plane such that the thrust plate 30 may be coupled to the shaft 10 in such a manner as to perpendicular to the axial direction, whereby the assembly defects of the thrust plate 30 may be removed.

In addition, the assembly defects of the thrust plate 30 are removed, whereby vibrations which may occur due to the assembly defects in the thrust plate 30 may be reduced.

The extension part 31 may include a hollow formed in order to be coupled to the coupling part 11. That is, the flat part 32 of the thrust plate 30 with the exception of the extension part 31 may have a disk or a doughnut shape; however, the extension part 31 may have a hollow shape in order to receive the coupling part 11.

Meanwhile, only one extension part 31 may be formed at the thrust plate 30; however, a plurality of extension parts 31 having different diameters may also be formed. A detailed description thereof will be made below with reference to FIG. 3.

The extension part 31 may be formed horizontally with the axial direction; however, at least one of the inner and outer surfaces of the extension part 31 may also be formed to be tapered. A detailed description thereof will be made below with reference to FIG. 4.

In addition, the extension part 31 may be formed in a continuous manner in a circumferential direction; however, it may also be formed in an interrupted manner in the circumferential direction. A detailed description thereof will be described below with reference to FIG. 5.

The stator 2 may be a fixing structure including a coil 5 generating electromagnetic force having a predetermined magnitude during the application of power and a plurality of cores 4 having the coil 5 wound therearound.

Each of cores 4 is fixedly disposed on an upper portion of a base 6 including a printed circuit board (not shown) having circuit patterns printed thereon, a plurality of coil holes having a predetermined size are formed to penetrate through the base 6 so as to expose the coil 5 downward, in an upper surface of the base 6 corresponding to the coil 5, and the coil 5 may be electrically connected to the printed circuit board (not shown) such that an external power is supplied thereto.

An outer circumferential surface of the sleeve 20 may be press-fitted in the base 6 to be fixed thereto, and the core 4 having the coil 5 wound therearound may be inserted into the base 6. An inner surface of the base 6 and an outer surface of the sleeve 20 may be assembled by applying an adhesive to the inner surface of the base 6 or the outer surface of the sleeve 20 or may be assembled by welding.

The rotor 3, which is a rotational structure provided to be rotated with respect to the stator 2, may include a rotor case 8 having a ring-shaped magnet 7 formed on an outer circumferential surface thereof, the magnet being disposed to be spaced by a predetermined interval from the core 4.

In addition, as the magnet 7, a permanent magnet generating magnetic force having a predetermined strength by alternately magnetizing an N pole and an S pole thereof in the circumferential direction is used.

In this case, the rotor case 8 may be configured to include a hub base 8a press-fitted in the upper end of the shaft 10 to be fixed thereto and a magnet support part 8b supporting the magnet 7 of the rotor 3 by extending from the hub base 8a in the outer diameter direction and being bent downward in the axial direction.

Figure 3:
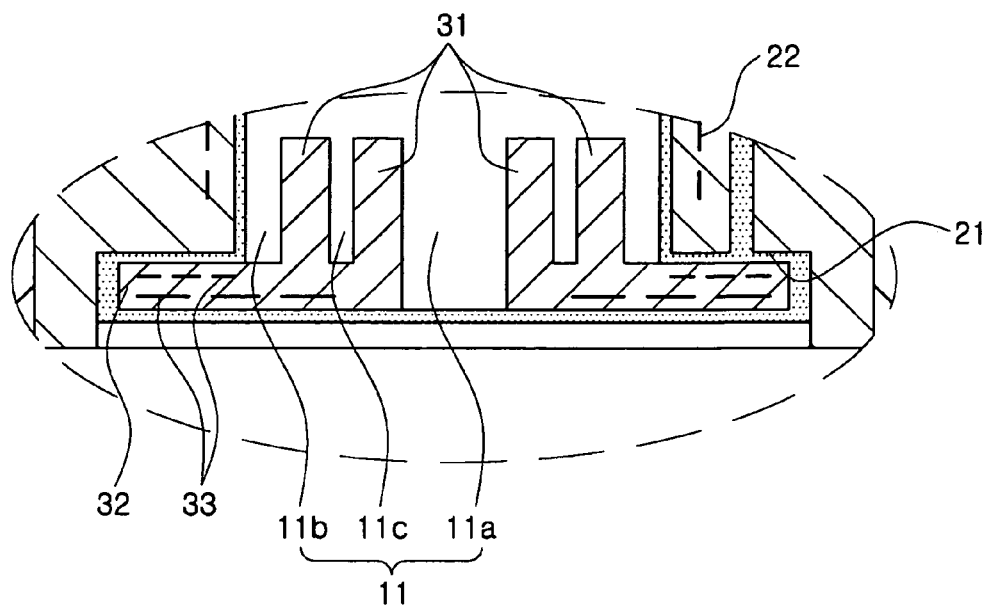
FIG. 3 is a cross-sectional view schematically showing a first embodiment of a modified thrust plate according to an exemplary embodiment of the present invention.

FIG. 3 is a cross-sectional view schematically showing a first embodiment of a modified thrust plate according to an exemplary embodiment of the present invention.

Referring to FIG. 3, only one extension part 31 according to the exemplary embodiment of the present invention may be formed at the thrust plate 30; however, a plurality of extension parts 31 having different diameters may also be formed. That is, the plurality of extension parts 31 having a concentric circle may be formed at the thrust plate 30, such that the coupling part 11 may include a first coupling part 11a contacting an innermost surface of the extension part 31, a second coupling part 11b contacting an outermost surface thereof, and a third coupling part 11c contacting inner/outer surfaces between the innermost and outermost surfaces.

Therefore, a coupling area between the thrust plate 30 and the shaft 10 may be increased, as compared to the case in which a single extension part 31 is formed.

Accordingly, the coupling force between the thrust plate 30 and the shaft 10 may be further increased, and vibration-resistant characteristics and impact-resistant characteristics of the thrust plate may also further improved.

Figure 4:
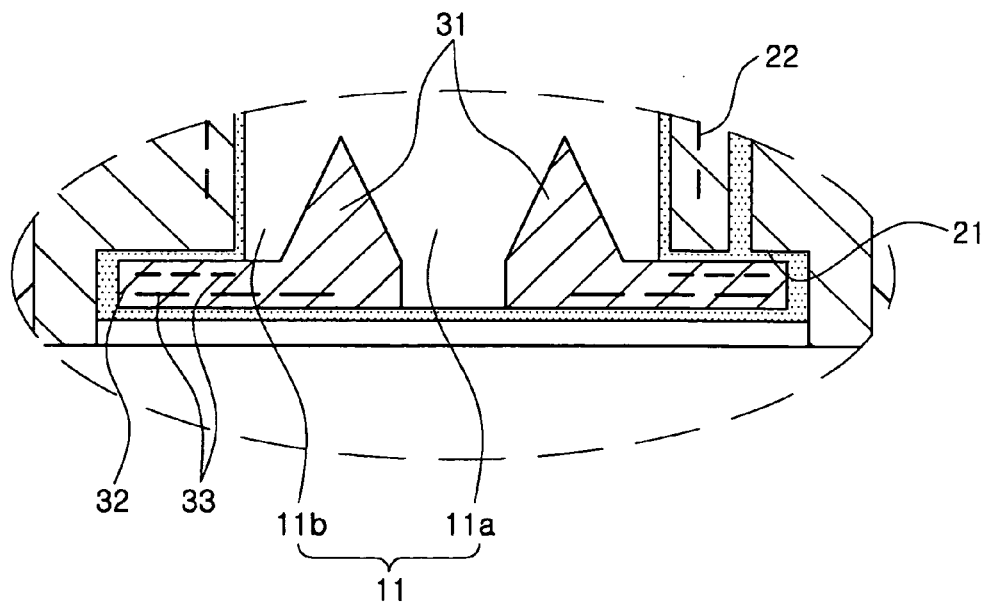
FIG. 4 is a cross-sectional view schematically showing a second embodiment of a modified thrust plate according to an exemplary embodiment of the present invention.

FIG. 4 is a cross-sectional view schematically showing a second embodiment of a modified thrust plate according to an exemplary embodiment of the present invention.

Referring to FIG. 4, the extension part 31 may be formed horizontally with the axial direction; however, at least one of the inner and outer surfaces of the extension part 31 may also be formed to be tapered. That is, at least one of the inner and outer surfaces of the extension part 31 may be formed to be inclined or may be formed to be curved.

Therefore, the thrust plate 30 may be inserted into the shaft 10 along a tapered surface of the extension part 31 during the coupling between the thrust plate 30 and the shaft 10, whereby the coupling therebetween is facilitated.

Figure 5:
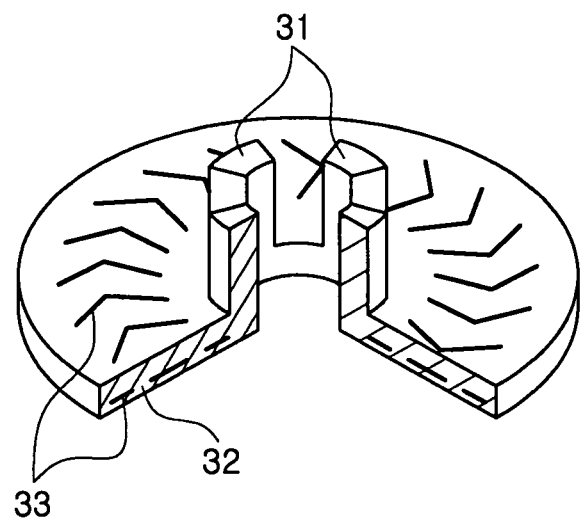
FIG. 5 is a cut-away perspective view schematically showing a third embodiment of a modified thrust plate according to an exemplary embodiment of the present invention.

FIG. 5 is a cut-away perspective view schematically showing a third embodiment of a modified thrust plate according to an exemplary embodiment of the present invention.

Referring to FIG. 5, the extension part 31 may be continuously formed at the thrust plate 30 in the circumferential direction; however, the extension part 31 may also be formed in an interrupted manner in the circumferential direction. That is, a plurality of fan-shaped extension parts 31 may be formed in the circumferential direction.

Meanwhile, when the extension part 31 is formed in an interrupted manner in the circumferential direction, the coupling part 11 of the shaft 10 may have a shape corresponding to that of the extension part 31.

Therefore, a advantage in which the thrust plate 30 may completely be dependent on the rotational driving of the shaft 10 is generated.

That is, the rotational force of the shaft 10 may be transferred to the thrust plate 30 by a structural shape of the extension part 31 and the coupling part 11 in which the coupling part 11 is positioned between the extension parts 31 formed to be spaced apart from each other, rather than depending on the coupling force by bonding.

Figure 6:
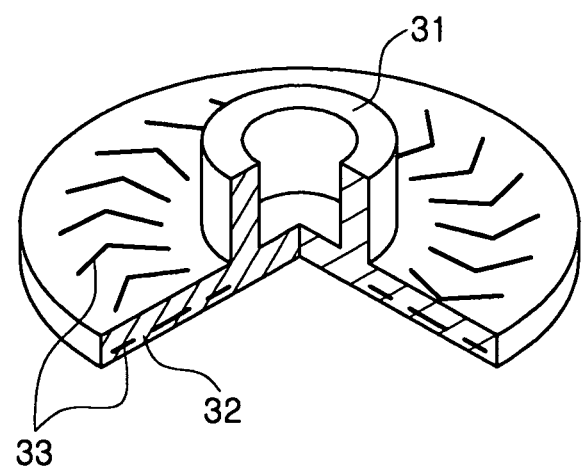
FIG. 6 is a cut-away perspective view schematically showing a fourth embodiment of a modified thrust plate according to an exemplary embodiment of the present invention.

FIG. 6 is a cut away perspective view schematically showing a fourth embodiment of a modified thrust plate according to an exemplary embodiment of the present invention.

Referring to FIG. 6, the flat part 32 according to the exemplary embodiment of the present invention may have a disk or doughnut shape. That is, the flat part 32 may have the doughnut shape in which the hollow is formed; however, the flat part 32 may also have the disk shape.

Therefore, even an end surface of one end of the shaft 10 may be in contact with thrust plate 30, whereby the contact area between the shaft 10 and the thrust plate 30 may be increased.

In addition, a surface area of the flat part 32 in which the thrust dynamic groove 33 may be formed is increased, whereby a larger thrust dynamic pressure may be generated.

While the present invention has been shown and described in connection with the exemplary embodiments, it will be apparent to those skilled in the art that modification and variation can be made withough departing from the spirit and scope of the invention as defined by the appended claims.

What is claimed is:

1. A hydrodynamic bearing assembly comprising:
    a sleeve having a shaft inserted thereinto and supported thereby;
    a thrust plate coupled to one end of the shaft;
    an extension part formed at the thrust plate to be extended in an axial direction so as to be coupled to the shaft; and
    a coupling part formed at the shaft to contact an inner surface of the extension part so as to be coupled to the extension part,
    wherein the coupling part includes a first coupling part contacting the inner surface of the extension part and a second coupling part contacting an outer surface of the extension part, and
    the extension part includes a hollow formed in order to be coupled to the first coupling part.

2. A motor comprising:
    the hydrodynamic bearing assembly of claim 1;
    a stator coupled to an outer circumferential surface of a sleeve and including a core having a coil for generating rotational driving force wound therearound; and
    a rotor having a magnet mounted on one surface thereof to be rotatable with respect to the stator, the magnet facing the coil.

\* \* \* \* \*